United States Patent [19]
Atherley

[11] Patent Number: 5,944,380
[45] Date of Patent: Aug. 31, 1999

[54] LIGHT-WEIGHT VEHICLE SEAT

[76] Inventor: James Atherley, 124 W. 450 North, American Fork, Utah 84003

[21] Appl. No.: 08/948,691

[22] Filed: Oct. 10, 1997

[51] Int. Cl.$^6$ ................................. B60N 2/40; B62J 1/22
[52] U.S. Cl. .................................. 297/195.1; 297/195.13; 297/214; 297/219.11; 297/452.48; 297/452.61; 297/DIG. 1; 297/DIG. 6; 180/219
[58] Field of Search ........................... 297/452.21, 195.1, 297/195.11, 195.13, 214, 215, 215.11, 219.11, DIG. 6, DIG. 1, 452.48, 452.61; 180/219

[56] References Cited

U.S. PATENT DOCUMENTS

| | | | |
|---|---|---|---|
| 3,388,946 | 6/1968 | Grace | 297/195.1 X |
| 3,588,171 | 6/1971 | Rich, Jr. | 297/214 X |
| 3,627,073 | 12/1971 | Grimm | 297/215.11 X |
| 3,741,596 | 6/1973 | Cate | 297/215.11 |
| 3,927,727 | 12/1975 | Haragan | 297/195.1 X |
| 4,095,820 | 6/1978 | Hanagan | 297/215.11 X |
| 4,125,285 | 11/1978 | Hanagan | 297/215.11 X |
| 4,451,083 | 5/1984 | Marchello | 297/214 X |
| 4,688,509 | 8/1987 | Nishida | 297/195.1 X |
| 4,691,963 | 9/1987 | Mikuniya et al. | 297/452.48 X |
| 4,779,695 | 10/1988 | Yasui . | |
| 4,779,924 | 10/1988 | Rudel | 297/195.13 |
| 4,925,513 | 5/1990 | Witzke et al. | 297/452.61 X |
| 5,040,632 | 8/1991 | Fujii et al. | 297/195.1 X |
| 5,088,747 | 2/1992 | Morrison et al. | 297/DIG. 6 X |
| 5,165,754 | 11/1992 | Louys | 297/391 |
| 5,190,350 | 3/1993 | Hwang et al. | 297/DIG. 1 X |
| 5,533,783 | 7/1996 | Harms et al. | 297/195.13 |
| 5,639,145 | 6/1997 | Alderman | 297/452.45 |
| 5,675,853 | 10/1997 | Linge | 5/655 |
| 5,713,630 | 2/1998 | Kualvik | 297/254 |
| 5,720,518 | 2/1998 | Harrison | 297/214 |
| 5,722,729 | 3/1998 | Carilli | 297/DIG. 1 X |
| 5,735,229 | 4/1998 | House et al. | 297/217.1 X |
| 5,802,642 | 9/1998 | Slaughter | 5/656 |

FOREIGN PATENT DOCUMENTS

| | | | |
|---|---|---|---|
| 4331676 | 11/1992 | Japan | 297/195.13 |
| 1507637 | 9/1989 | Switzerland | 297/214 |

Primary Examiner—Peter M. Cuomo
Assistant Examiner—Rodney B. White
Attorney, Agent, or Firm—Thorpe, North & Western, L.L.P.

[57] ABSTRACT

A light-weight vehicle seat, particularly well suited for snowmobiles, has a rigid base section for mounting on a vehicle. The base section has a closed-cell structure with cell walls and cell voids such that the base section is substantially light-weight. The closed-cell structure also resists absorbing water, insulates the rider from heat generated by the vehicle, and muffles noise created by the vehicle. The vehicle seat has a flexible seat section for providing a cushioned seat. The vehicle seat also has a waterproof cover for covering the base section and seat section. The vehicle seat is preferably attached to the vehicle with hook-and-loop type fasteners. A utility cavity is formed in the seat. Alternatively, the seat section may be removably disposed on the base section and seat sections of various flexibility provided to suit the weight of the rider.

9 Claims, 4 Drawing Sheets

LIGHT-WEIGHT VEHICLE SEAT

BACKGROUND OF THE INVENTION

1. Field of the Invention

The present invention relates to a light-weight vehicle seat, particularly well suited for use with snowmobiles. More particularly, the present invention relates to a vehicle seat having a generally rigid lower portion with closed-cell structure, a flexible upper portion with open-cell structure, a cover, and a hook-and-loop type fastener for attaching the seat to the vehicle.

2. Prior Art

Most vehicles require a cushioned seat for the rider to sit on for comfort, as well as safety. Off-road or recreational vehicles, such as snowmobiles, water craft, motorcycles, and all-terrain vehicles (ATVs), especially require a cushioned seat due to the rough ride.

For many of these vehicles, weight is also an issue and any reduction in weight is significant. For example, additional weight on a snowmobile adds to the problem of the track sinking into the snow and stalling the snowmobile. The added weight also reduces fuel efficiency and reduces speed, an issue for racing snowmobiles. As another example, additional weight on a watercraft, such as a wet bike, effects the buoyancy of the craft and alters its stability by raising the center of gravity. Such stability concerns are also an issue with ATVs.

Traditional seats have a rigid base of metal or plastic. The base is covered in a softer padding. The padding and base are covered with a covering to keep the padding fixed to the base and to keep the padding from coming apart. These seats are typically formed as a unitary part that is bolted to the vehicle frame.

One problem with the traditional seats is the significant weight. The metal or plastic base is particularly heavy. The typical snowmobile base weighs approximately six pounds, while the entire seat weighs approximately 15 to 18 pounds.

Another problem with the traditional seats is that they absorb moisture. While the covers are sometimes water-resistant, moisture still seeps in through the seams. The covers are also easily ripped, also allowing moisture to enter. The cushions are typically made with an open-cell foam that absorbs water. The cushion tends to act like a giant sponge, soaking up water and increasing the weight of the seat. Absorbed moisture also effects the performance of the cushion. Moisture not only causes the foam to deteriorate, but a cold and wet seat is uncomfortable and may later freeze, making the seat dangerously hard.

Another problem with the traditional seats is that the cover is formed permanently with the base and cushion. Thus, the cover cannot be removed for cleaning.

A further problem with the traditional seats is that they bolt or otherwise attach to the frame of the vehicle. Many vehicles locate critical parts, such as batteries, engines, and fuel tanks, under the seat. The bolts make the seat difficult and time consuming to remove, as well as adding weight. In addition, tools must be carried, adding weight.

Therefore, it would be advantageous to develop a vehicle cushion with reduced weight. It would also be advantageous to develop a vehicle seat that does not absorb and retain moisture. It would also be advantageous to develop a vehicle seat with a removable cover. In addition, it would be advantageous to develop a vehicle seat that is easier to remove from the vehicle.

OBJECTS AND SUMMARY OF THE INVENTION

It is an object of the present invention to provide a vehicle seat that is light-weight.

It is another object of the present invention to provide a vehicle seat that does not absorb and retain water.

It is yet another object of the present invention to provide a vehicle seat with a removable cover.

It is a further object of the present invention to provide a vehicle seat that is easy to remove.

It is a further object of the present invention to provide a vehicle seat with variable densities to conform to the weight of a rider.

These and other objects and advantages of the present invention are realized in a vehicle seat having a generally rigid base section with a closed-cell structure. The base section has a lower surface and is disposed on the vehicle. The seat also has a flexible seat section disposed on the base section. The seat section has an upper surface on which a rider may sit.

The closed-cell structure of the base section is substantially rigid and light-weight. In addition, the closed-cell structure insulates the rider form heat generated by the vehicle and muffles sound produced by the vehicle.

The seat also has a cover for covering the seat section and at least a portion of the base section. The cover is preferably waterproof and removable.

The seat may be attached to the vehicle by hook-and-loop type fasteners and/or snap type fasteners. Thus, the seat may be easily and quickly removed from the vehicle.

The seat may also have a flexible seat section removably disposed on the base section. Flexible seat sections of various densities, or of various flexibility, may be provided to conform to the weight of various riders. The flexible seat section may attach to the base section by hook-and-loop type fasteners as well.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
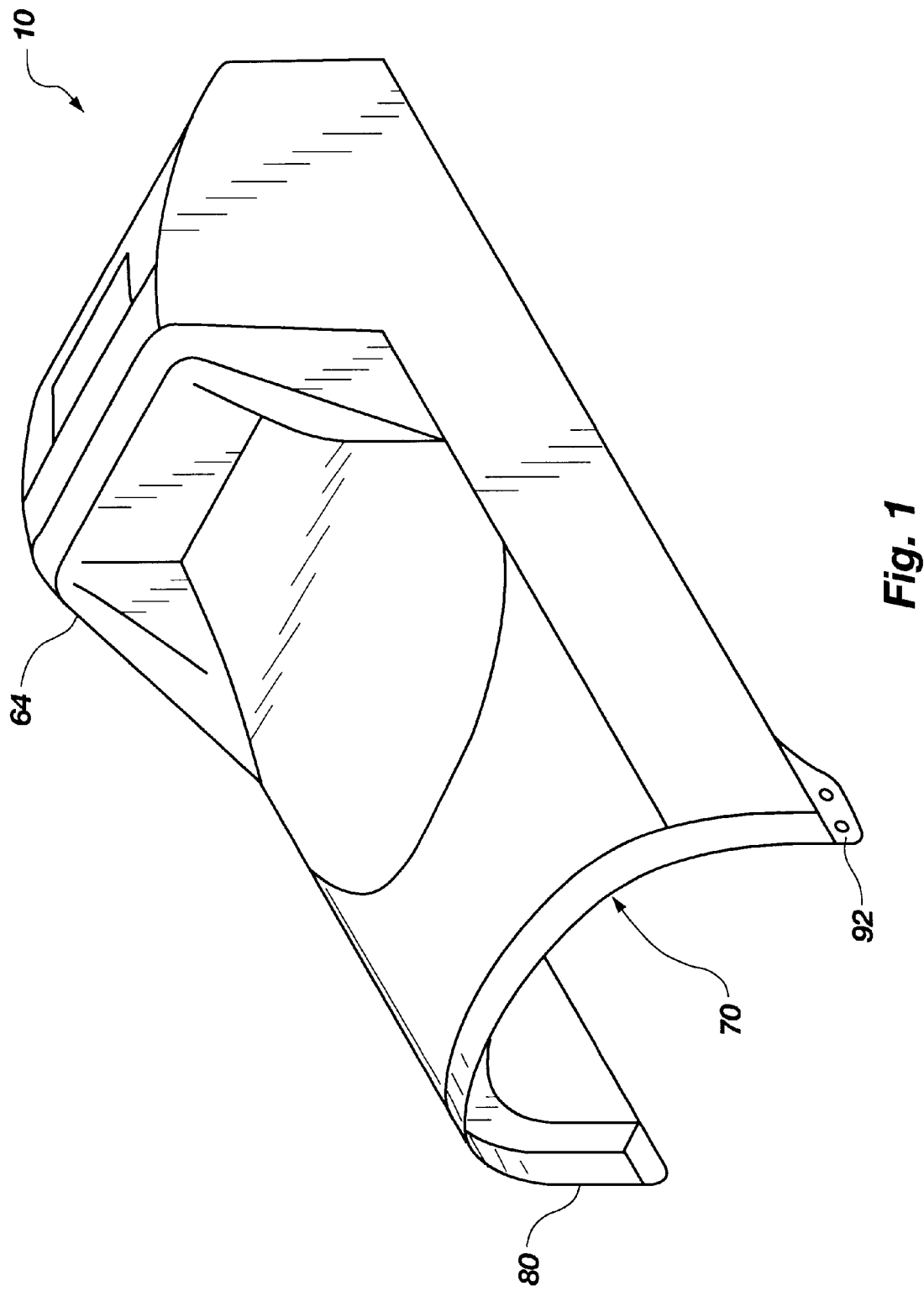
FIG. 1 is a perspective view of a preferred embodiment of the vehicle seat of the present invention.
Figure 2:
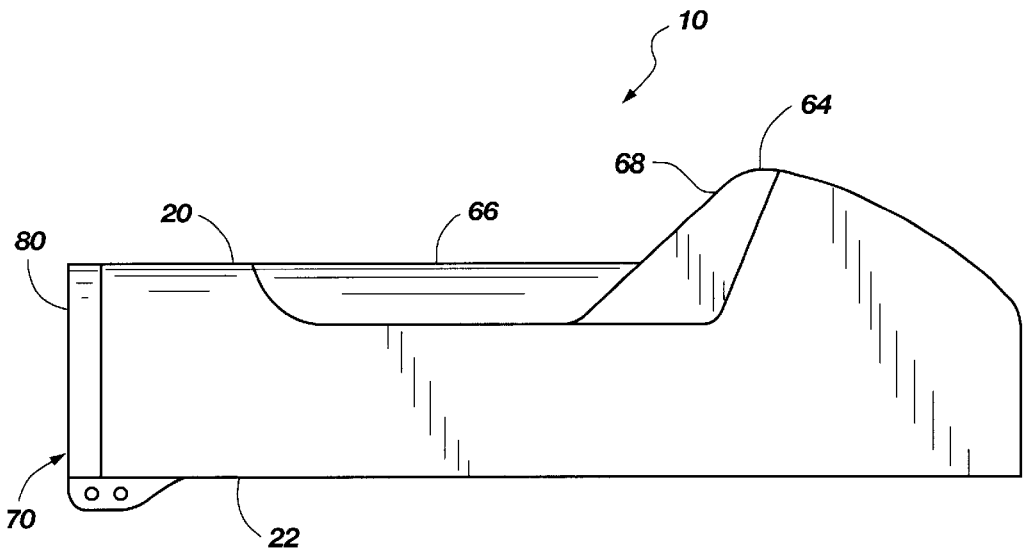
FIG. 2 is a side elevational view of a preferred embodiment of the vehicle seat of the present invention.
Figure 3:
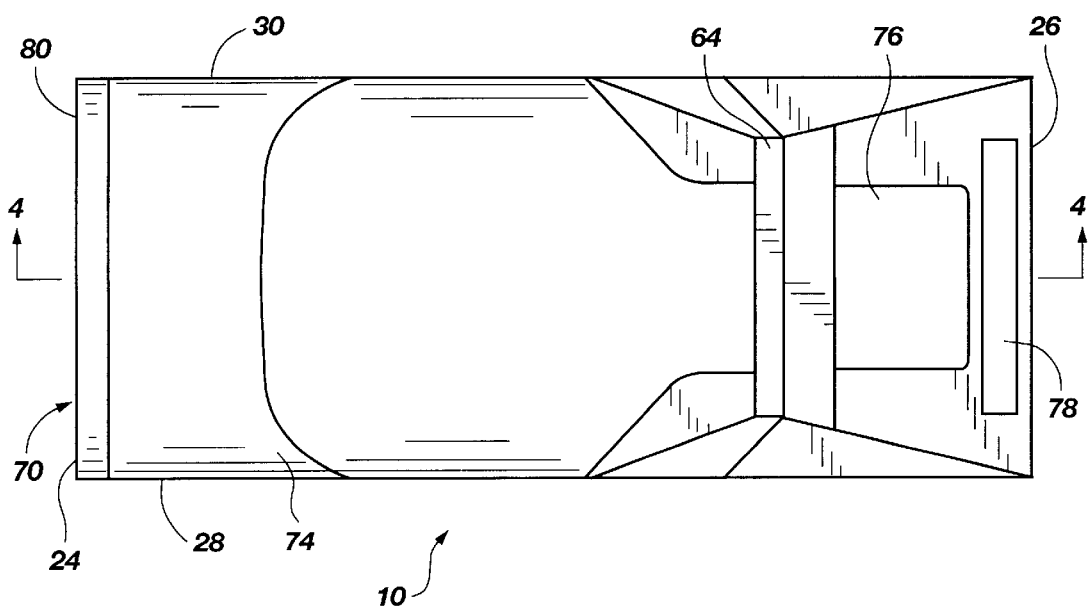
FIG. 3 is a top view of a preferred embodiment of the vehicle seat of the present invention.

As illustrated in FIGS. 1–3, a preferred embodiment of a vehicle seat 10 of the present invention is shown. The seat shown in the figures is configured for use with a snowmobile. It is of course understood that the vehicle seat of the present invention is not limited to use with snowmobiles, but may be configured for use with any vehicle, including watercraft, motorcycles, and all-terrain vehicles (ATVs).

Referring to FIG. 2, the vehicle seat 10 has an upper surface 20 and a bottom 22. The upper surface 20 provides a seat for the rider to sit on. The bottom 22 is disposed on the vehicle. Referring to FIG. 3, the seat 10, as configured for use on a snowmobile, has a front 24, a back 26, a left side 28 and a right side 30. The front 24, like the bottom 22, abuts the vehicle. The back 26 may form a portion of the rear of the vehicle. The front 24, back 26, and left and right sides 28 and 30 preferably mate with the vehicle in an aesthetically pleasing manner, thus blending with the design and lines of the vehicle.

Figure 4:
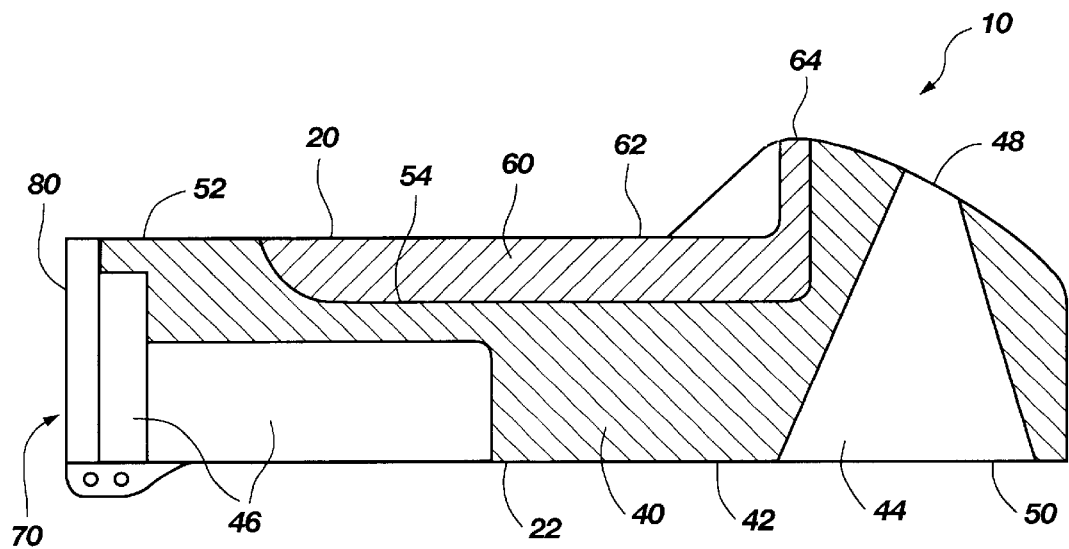
FIG. 4 is a cross section view of a preferred embodiment of the vehicle seat of the present invention taken along line 4—4 of FIG. 3.

As illustrated in FIG. 4, the vehicle seat 10 has a base section 40. The base section 40 is substantially rigid and provides support for the seat 10. The base section 40 advantageously has a closed-cell structure that is substantially light weight. The closed cell structure has cell walls and cell voids. The cell walls provide strength and rigidity while the cell voids reduce weight. In addition, the base section 40 does not absorb moisture and water because of the closed cells. The base section 40 is preferably made of a closed-cell foam.

A vehicle seat configured as shown for a snowmobile has a total weight of approximately 4 to 6 pounds. Prior art snowmobile seats weigh approximately 15 to 18 pounds. In addition, a vehicle seat configured as shown for a snowmobile absorbs approximately 90% less water. The closed-cell base section is a significant improvement over prior art seats utilizing metal or plastic frames and open cell foam cushioning because the closed-cell structure forms a substantially rigid base without adding weight or absorbing water.

The closed-cell structure also acts as a temperature insulator, protecting the rider from heat generated by the vehicle and/or cold weather. The closed-cell structure also helps muffle engine noise produced by the vehicle.

The base section 40 has a lower surface 42 that forms at least part of the bottom 22. A utility cavity 44 may be formed in the base section 40 for holding various items, such as gloves, tools, food, water bottles, a first aid kit, etc. The utility cavity 44 may be a general cube or pyramid shape or may be configured for the specific item to be carried. Again, the closed-cell structure defining the cavity also provides insulation to maintain the temperature of the item carried. Thus, the closed-cell structure may help keep coffee hot on snowmobile treks or keep soda and water cold on watercraft and ATVs. An access opening 48 is formed in the seat 10 to provide access to the utility cavity 40. The cavity 44 may be left open to the vehicle, shown at 50, so that heat generated by the vehicle may be used to maintain the temperature of the items contained in the cavity, such as coffee or tools. Additional cavities 46 are formed in the base section 40 so that the seat 10 fits around various vehicle components, such as a gas tank, an engine, a battery, etc.

The base section 40 also has an upper surface 52. The upper surface 52 preferably has an indentation 54 formed therein for receiving a cushioned seat as discussed in more detail below. The upper surface 52 of the base section 40 may also form part of the upper surface 20 of the seat 10.

The vehicle seat 10 has a seat section 60. The seat section is preferably disposed in the indentation 54 formed in the base section 40. The seat section 60 has an upper surface 62 on which a rider may sit. The seat section 60 is flexible and provides a cushioned seat for the rider. The seat section 60 is preferably open-cell foam.

Alternatively, the base section 40 may have an upper surface 52 without an indentation and upon which the seat section 60 is disposed. The seat section 60 may cover the entire upper surface 52 of the base section 40, thus providing an elongated, cushioned seat for multiple riders.

Although the base section 40 has a closed-cell structure that is substantially rigid, it also has some flexibility that provides some cushioning effect. Therefore, the flexible seat section 60 need not be as thick as required for the prior art metal or plastic base frames.

Referring to FIG. 2, the base section 40 and seat section 60 may be configured to form a back support 64. The seat section 60 may have a central portion 66 and a back support portion 68 formed rearwardly of the central portion.

Referring again to FIGS. 1–4, the vehicle seat 10 has a cover 70. The cover 70 preferably extends over most of the base section 40 and seat section 60. The cover 70 may be formed of any suitable material or combination of materials. In addition, the cover is preferably strong enough to resist tears or punctures and is also preferably waterproof or water resistant to prevent moisture from seeping into the seat section. The cover is preferably canvas covering most of the base section and vinyl covering the seat section.

Figure 6:
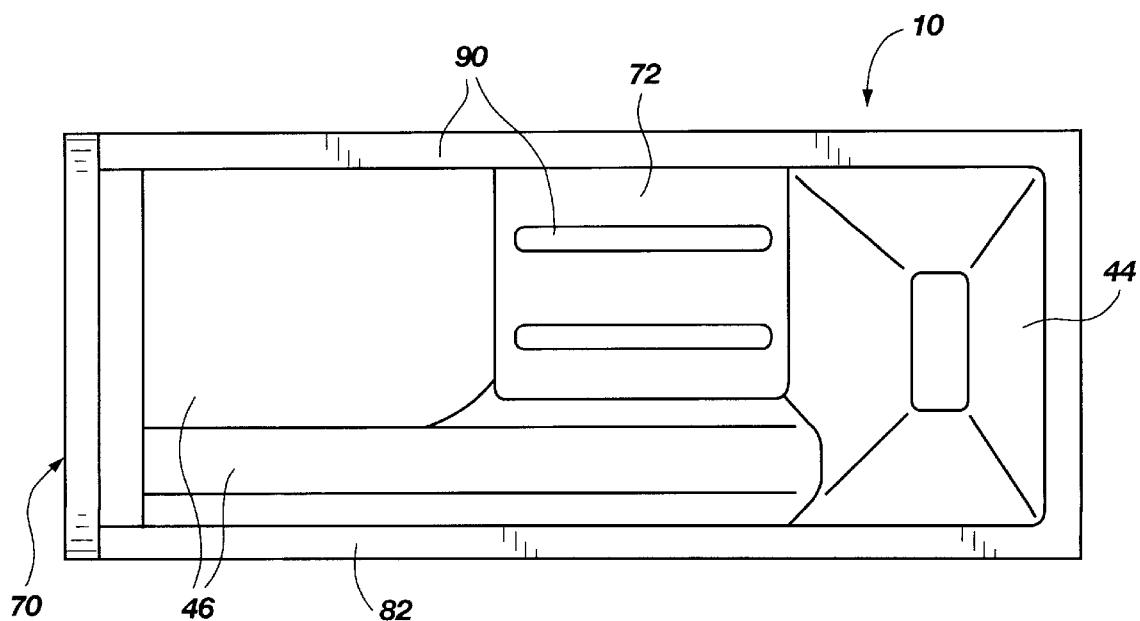
FIG. 6 is a bottom view of a preferred embodiment of the vehicle seat of the present invention.

In addition, the cover is advantageously removable. Thus, it can be removed for washing or repair. The cover may be comprised of various pieces or sections coupled together in order to cover the desired portion of the seat. For example, the cover 70 may have a lower seat cover 72, as shown in FIG. 6, and an upper seat cover 74, as shown in FIG. 3. The lower seat cover 72 covers any desired portion of the lower surface of the base member 40 while the upper seat cover 74 covers the seat section 60 and desired portions of the base section.

Referring to FIG. 3, the upper seat cover 74 has a flap 76 pivotally disposed over the access opening 48 to the utility cavity 44. The flap 76 may have one edge sewn into the cover 70 about which the flap pivots in order to open and close. The flap may be held closed by a hock-and-loop type fastener, a snap type faster or a zipper. The seat 10 may also have a reflector 78 which is preferably sewn into the cover 70.

The cover 70 may also have a sleeve 80 formed therein for overlapping, or otherwise mating with, a portion of the vehicle, as shown in FIGS. 1–4. The sleeve 80 prevents moisture or dirt from getting in between the seat 10 and the vehicle and into vehicle parts.

Referring to FIG. 6, the seat 10 is preferably attached to the vehicle by hook-and-loop type fasteners, shown at 90. Alternatively, the seat 10 may be attached by snap type fasteners, shown at 92 in FIG. 1. This allows the seat to be removed from the vehicle for service. The fasteners 90 are preferably located about the periphery of the lower surface 22 and on any part of the lower surface 42 of the base section 40 which contacts the vehicle.

Figure 5:
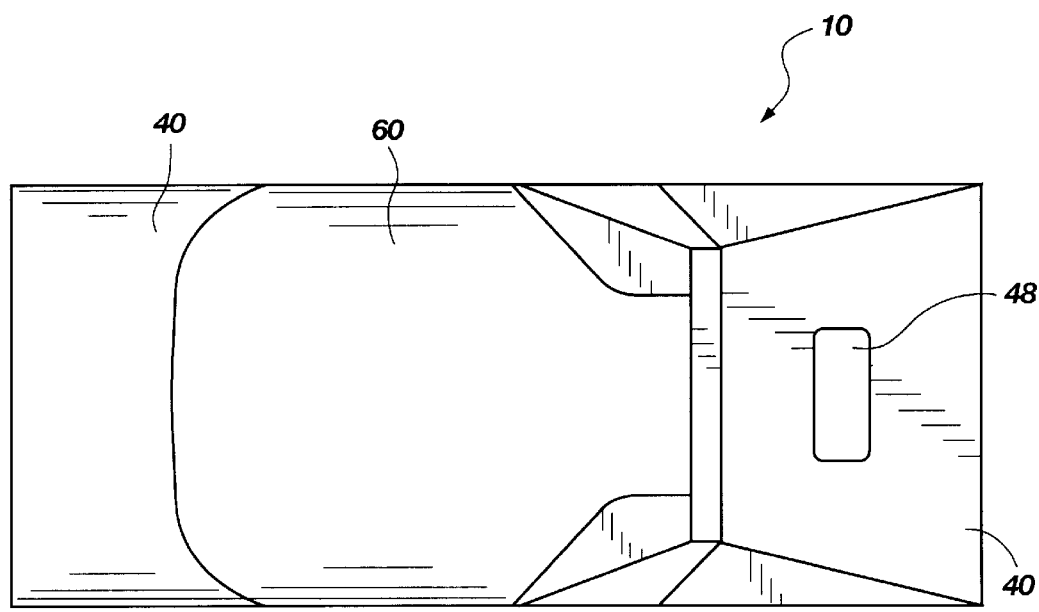
FIG. 5 is a top view of a preferred embodiment of a vehicle seat of the present invention with the cover removed.

The cover 70 preferably has a tab 82 formed about the periphery of the upper seat cover 74 and extends under the base section 40. The tab 82 may have hock-and-loop fasteners 90 on one side to couple to the lower seat cover 72 and on the other side to attach the cover 70 and seat 10 to the vehicle. In this is manner, the weight of the rider is utilized to maintain the hook-and-loop fasteners 90. The seat 10 is shown with the cover 70 in FIG. 3 and without the cover 70 in FIG. 5. The upper and lower seat covers 72 and 74 may be coupled by any suitable means, including hook-and-loop type fasteners, snap type fasteners, zippers, etc.

The hook-and-loop type fasteners are preferred as they make installing the seat on an existing vehicle easier. For example, the loop portion of the fastener may be sewn into the cover while the hook portion of the fastener is provided with an adhesive backing. With the hook portion fastened to the loop portion, the adhesive backing on the hook portion may be exposed and the seat then positioned on the vehicle, easily locating the hook portion of the fastener on the vehicle.

Figure 7:
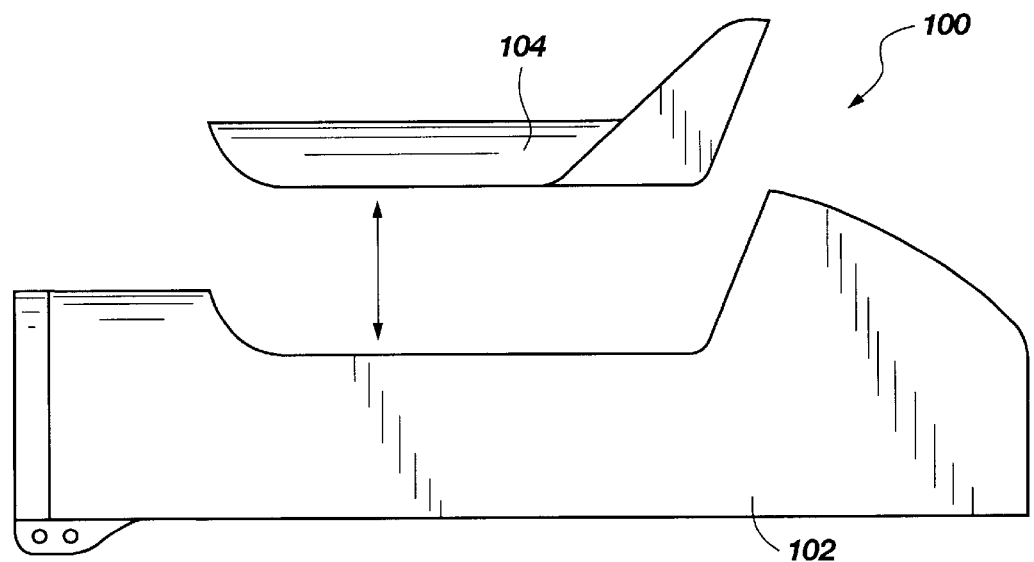
FIG. 7 is a side elevational view of an alternative embodiment of the vehicle seat of the present invention.

As illustrated in FIG. 7, an alternative embodiment of the vehicle seat 100 is shown. The seat 100 has a base section 102 and a seat section 104 removably disposed on the base section. The seat section 104 may be attached to the base section 102 with hook-and-loop type fasteners. Seat sections of various densities of open-cell foam may be provided such that the seats have varying degrees of flexibility. Thus, riders of various weight may select a seat section 104 of appropriate flexibility to suit their comfort.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. A light-weight snowmobile seat for a snowmobile comprising:
    a generally rigid base section having a lower surface configured for removably mounting on the snowmobile and formed of closed cell foam with cell walls and cell voids such that the base section is substantially rigid and light weight, and such that the base section resists absorbing moisture;
    a flexible seat section formed of open cell foam disposed on the base section and having an upper surface on which a rider may sit;
    cover means for covering at least the seat section and made of a water resistant material such that the cover means prevents the flexible sear section from absorbing moisture; and
    attachment means for removably attaching the base section to the snowmobile including hook-and-loop type fasteners disposed on the base section and the snowmobile and snap type fasteners disposed on the base section and the snowmobile to mate and hold the base section in place when placed upon the snowmobile.

2. The seat of claim 1, wherein the seat section includes a central portion and a back support portion formed rearwardly of the central portion.

3. The seat of claim 1, wherein the base section has an upper surface and the seat section is disposed on the upper surface of the base section such that the seat section extends over the upper surface of the base section.

4. The seat of claim 1 wherein the base section has an upper surface with an indentation and the seat section is disposed in the indentation.

5. The seat of claim 1, further comprising a cavity formed in the base section for holding items.

6. A light-weight snowmobile seat for snowmobiles comprising:
    a generally rigid base section having a lower surface for mounting on snowmobile and formed of closed cell foam with cell walls and cell voids such that the base section is substantially rigid and light weight, and such that the base section resists absorbing moisture;
    a flexible seat section formed of open cell foam disposed on the base section and having an upper surface on which a rider may sit;
    a cover means for covering the seat section and at least a portion of the base section and made of a water resistant material such that the cover means prevents the flexible sear section from absorbing moisture, the cover means including a lower cover section covering at least a portion of the lower surface of the base section, an upper cover section covering the upper surface of the seat section and at least a portion of the base section, and joining means for releasably joining the upper cover section and the lower cover section together such that the cover means is removable, the upper cover section including a tab extending under the base section; and
    an attachment means for removably attaching the base section to the snowmobile, the attachment means including hook-and-loop type fasteners disposed on the cover means and the snowmobile and snap type fasteners disposed on the cover means and the snowmobile to mate and hold the base section in place when placed upon the snowmobile.

7. The seat of claim 6, further comprising a cavity formed in the base portion for holding items.

8. The seat of claim 7, wherein the cover means includes a flap pivotally disposed over the cavity.

9. The seat of claim 6, further comprising a reflective means.

* * * * *